Patented Aug. 15, 1944

2,355,650

UNITED STATES PATENT OFFICE 2,355,650

PRODUCTION OF VISCOSE

John Phillip Hollihan, Jr., Garden City, Pa., assignor to American Viscose Corporation, Wilmington, Del., a corporation of Delaware No Drawing. Application December 18, 1942, Serial No. 469,469

5 Claims. (Cl. 260—216)

This invention relates to the production of viscose and is particularly concerned with the step during which alkali cellulose is reacted with carbon disulfide.

In the manufacture of viscose, cellulose in the form of sheets of cotton linters, wood pulp, other cellulosic fibers or mixtures thereof, is steeped in caustic soda of 17 to 18% concentration for a period of about two hours at a controlled temperature. After squeezing out excess caustic steep liquor, a batch of "alkali cellulose" containing a certain amount of residual water and caustic soda is obtained which is shredded and aged under controlled conditions. The aged alkali cellulose crumbs are then converted into cellulose xanthane by agitating them with carbon disulfide for a period of from two to three hours under controlled temperature conditions usually between 18° C. and 50° C. After suitable aging, viscose thus prepared is spun in known manner.

In accordance with this invention, it has been discovered that the reaction of the alkali cellulose with carbon disulfide can be shortened to a period of time from about $\frac{1}{2}$ to $\frac{1}{15}$ of the time heretofore required by conducting the xanthation in the presence of ammonia in low concentration. The preferred proportion is on the order of about 0.5% of ammonia based on the total weight of alkali cellulose which corresponds to a proportion on the order of 0.1% on the basis of viscose produced. While the proportion of ammonia may be somewhat lower, even as low as 0.2% based on the weight of alkali cellulose, it has been found that the use of a proportion less than this specified lower limit has a negligible effect upon the speed of xanthation and consequently it is not considered that the action of the ammonia is catalytic. Greater proportions of ammonia may be used up to about 2% or more on the weight of alkali cellulose but no particular advantage occurs from using such higher percentage and where greater amounts than 2% have been used, trouble has been encountered in maintaining such larger amounts of ammonia in effective contact with the alkali cellulose crumbs, in preventing escape of the ammonia to the atmosphere, and in decreased partial pressure of the carbon disulfide in the churn.

The acceleration effected by means of the ammonia is independent of the proportion of carbon disulfide used for all practical purposes and no change of the temperature conditions from those normally employed during the xanthation is needed. By way of illustration the process may be advantageously carried out at any temperature between about 0° C. and about 60° C. The use of ammonia may be applied to the xanthation in either a batch or a continuous process. In either case, the shortening of the time required during xanthation reduces the equipment requirements for the production of a given amount of viscose.

The following examples are described by way of illustration:

Example 1

Into a xanthating churn containing a 700-pound batch of alkali cellulose (analyzing approximately 30% cellulose, 15% sodium hydroxide, and 55% water), 71½ pounds of carbon disulfide and 3½ pounds of ammonia were introduced. The temperature at the start was about 18° C. and was maintained within 5° of this temperature throughout xanthation. After about thirteen minutes, churning was stopped, vapors within the churn were exhausted, and the churn was discharged. The xanthate produced was dissolved in a caustic soda solution and allowed to age in the normal way, after which it was spun into filaments in the customary coagulating and regenerating baths. The filaments obtained were normal in every respect.

Example 2

Into a xanthating vessel containing a 700-pound batch of alkali cellulose, 88½ pounds of carbon disulfide and sufficient concentrated ammonia to yield 3½ pounds were introduced. The temperature conditions corresponded to those of Example 1 and, although xanthation under such conditions would ordinarily require a period of about 3½ hours in the absence of ammonia, it was found that thirteen minutes of xanthation in the presence of ammonia yielded a satisfactory xanthate with a minimum of degradation. The finished xanthate, after dissolving in caustic soda and aging, was spun into filaments which were normal in every respect.

As stated above, the use of ammonia effectively accelerates the reaction throughout the normal temperature ranges employed in producing the xanthate. While a period of thirteen to fifteen minutes is preferably used when xanthating at the temperature conditions mentioned in the examples, where higher temperatures of xanthation are employed, a shorter time, such as eight to ten minutes, would be highly satisfactory.

As stated previously, the effect of ammonia is not considered to be catalytic. While it is not desired to be limited to any particular theory of operation, it is thought that the ammonia exerts a swelling effect upon the cellulose or alkali cellulose which assists the penetration of such materials by the carbon disulfide.

While preferred embodiments of the invention have been disclosed, it is to be understood that changes and variations may be made without departing from the spirit and scope of the invention as defined by the appended claims.

I claim:

1. In the process of producing cellulose xanthate, the step of reacting a water-containing alkali cellulose with carbon disulfide in the presence of a proportion of ammonia between 0.2% to 2% based on the total weight of alkali cellulose.

2. In the process of producing cellulose xanthate, the step of reacting a water-containing alkali cellulose with carbon disulfide at a temperature between 0° C. and about 60° C. in the presence of a proportion of ammonia between 0.2% to 2% based on the total weight of alkali cellulose.

3. In the process of producing cellulose xanthate, the step of reacting a water-containing alkali cellulose with carbon disulfide in the presence of a proportion of ammonia on the order of 0.5% based on the total weight of alkali cellulose.

4. In the process of producing cellulose xanthate, the step of reacting a water-containing alkali cellulose with carbon disulfide at temperatures between 0° C. and about 60° C. in the presence of a proportion of ammonia on the order of 0.5% based on the total weight of alkali cellulose.

5. In the process of producing cellulose xanthate by the reaction with carbon disulfide of an alkali cellulose produced by the steeping of a cellulosic fibrous pulp in caustic soda solution and the subsequent pressing of excess caustic steep liquor therefrom, the step of reacting the resulting pressed alkali cellulose with carbon disulfide in the presence of a proportion of ammonia between 0.2% to 2% based on the total weight of alkali cellulose.

JOHN PHILLIP HOLLIHAN, JR.